Nov. 26, 1935.  J. W. DAWSON  2,021,888
ELECTRIC DISCHARGE APPARATUS
Filed June 29, 1933   4 Sheets-Sheet 1

WITNESSES:

INVENTOR
John W. Dawson.
BY
ATTORNEY

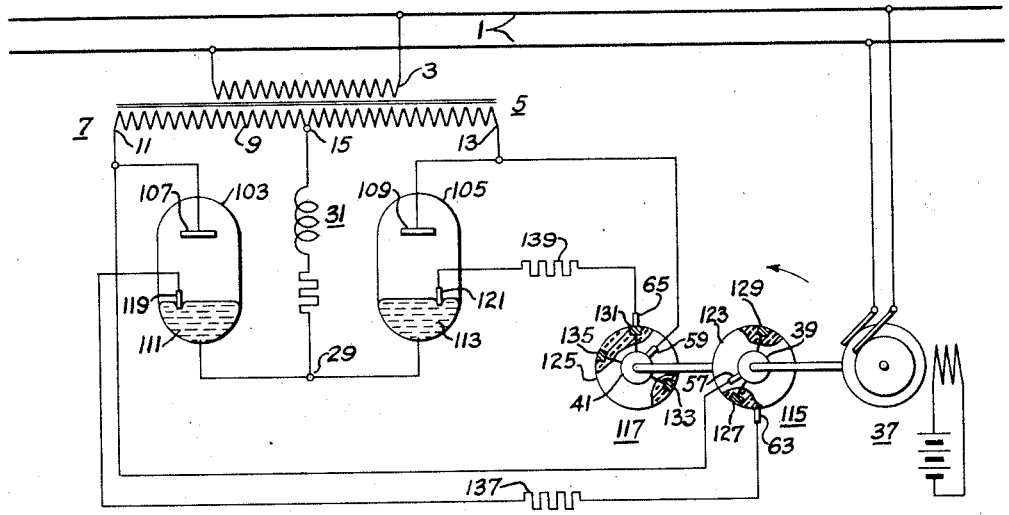

Nov. 26, 1935. J. W. DAWSON 2,021,888
ELECTRIC DISCHARGE APPARATUS
Filed June 29, 1933   4 Sheets-Sheet 3

WITNESSES:
Leon J. Vaza
Hymen Diamond

INVENTOR
John W. Dawson.
BY F. W. Lyle,
ATTORNEY

Nov. 26, 1935.  J. W. DAWSON  2,021,888
ELECTRIC DISCHARGE APPARATUS
Filed June 29, 1933  4 Sheets-Sheet 4

WITNESSES:

INVENTOR
John W. Dawson.
BY
ATTORNEY

UNITED STATES PATENT OFFICE 2,021,888

ELECTRIC DISCHARGE APPARATUS

John W. Dawson, Wilkinsburg, Pa., assignor to Westinghouse Electric & Manufacturing Company, East Pittsburgh, Pa., a corporation of Pennsylvania Application June 29, 1933, Serial No. 678,237

23 Claims. (Cl. 175—363)

My invention relates to electric discharge apparatus and it has particular relation to apparatus of the type utilized in power supply systems.

The present application is a continuation in part of my application Ser. No. 653,451 filed Jan. 25, 1933, and assigned to the Westinghouse Electric & Manufacturing Company. In its more restricted scope, the present application is, moreover, an improvement of the system shown and described in my Patent No. 1,928,812, filed December 19, 1930, granted October 3, 1933, and assigned to the W. E. & M. Co., reissue applied for January 11, 1934, Serial No. 706,303. For this reason the objects accomplished by my present invention can perhaps be most adequately explained with reference to the patent.

In my aforesaid Patent No. 1,928,812, a power supply system for vibratory apparatus, such as a mechanical shaker screen, for example, is shown and described. The element that is to be vibrated is coupled to an electromagnet that is intermittently energized and deenergized. When the magnet is so energized and deenergized, it sets the vibrating element in vibration. The electromagnet is energized from a suitable power source through a plurality of electric discharge devices of the asymmetric type.

The power source is of the alternating current type and, in practice, has the usual commercial frequency of 60 cycles per second. The frequency at which it is desired to motivate the vibrating element is, in general, of the order of 10 or 15 cycles per second, and the electric discharge devices are utilized for the purpose of controlling the supply of intermitting current to the magnet.

The electric discharge devices of the type preferably utilized in the system described in the above-mentioned applications each have an anode, a cathode and a control electrode, all immersed in a gaseous medium at a low pressure. Each of the devices has only an energized condition and a deenergized condition and is capable only of abrupt transition from one condition to the other. The particular condition of the device at any given time depends on the potential applied between the anode and the cathode (which will be herein designated as the principal potential) and on the potential impressed between the control electrode and the cathode (which will be herein designated as the control potential). When the principal potential is positive i. e., the anode is positive relative to the cathode) and of proper magnitude and when the control potential is of proper magnitude relative to the principal potential, the electric discharge device is energized. It thereafter remains in its energized condition regardless of the variations in magnitude of the control potential until the principal potential is reduced to a value substantially below the ionization potential of the gas in which the electrodes are immersed.

When the principal potential impressed on the electric discharge device is an alternating potential, the device remains deenergized as long as the control potential remains below a predetermined value, (which I shall herein designate as the limiting control potential). If the control potential at any time during the interval during which the principal potential is positive rises above the limiting control potential, the electric discharge device becomes energized and remains energized during the remaining portion of the positive half cycle of principal potential and it becomes deenergized only when the principal potential is sufficiently reduced.

In the system described in my aforesaid patent, the electric discharge devices are supplied with commercial alternating potential. They are, therefore, even when once energized, deenergized with a periodicity dependent on the frequency of the source and with this periodicity are subject to the control of the control potential. The control potential is varied in a manner corresponding to the frequency at which it is desired to energize the vibrating element of the shaker.

When the control potential impressed on the electric discharge devices is of proper magnitude the devices are alternately energized, as positive principal potential is impressed on their electrodes, and the load is supplied with current. Subsequently, the control potential impressed on the electric discharge devices is so varied that they are both deenergized, in which case, the electromagnet of the vibrator system should also be deenergized. However, it will be noted that during the energizing period a magnetic flux of considerable magnitude is built up in the electromagnet. As the flux collapses a back potential appears across the terminals of the electromagnet, and this potential would tend, in the absence of proper suppressing apparatus, to maintain the last of the electric discharge devices to be energized in spite of the fact that the control potential and the principal potential supplied by the power source is at a value corresponding to a deenergized condition. Essentially what happens in such a case is that the back potential of the load is greater than the forward potential of the source and in consequence thereof the principal potential impressed on the electric discharge device remains positive.

To suppress this condition, I have, in accordance with the above-mentioned application, provided a dissipating-network which is asymmetrically conductive. The network is connected across the windings of the electromagnet in such manner that it is non-conductive to the current flowing into the windings of the electromagnet when the latter is being energized, but is conductive to a current transmitted under the back-electromotive force generated by the collapse of the flux in the electromagnet. The energy stored in the electromagnet is thus dissipated in the network and prevents the electric discharge devices from remaining energized when they should be deenergized.

It is to be noted that the use of the dissipating network in the system described in my earlier application results in the loss of a considerable portion of the energy supplied to the load. The operation of systems in which the currents transmitted through the load are comparatively high therefore, involves considerable expense. In addition I have found that suppressing networks of the type utilized in the systems described in my earlier application do not always operate efficiently to suppress the back electro-motive force and do not suppress this electro-motive force at the high rate that is necessary for proper operation.

It is, accordingly, an object of my invention to provide a mechanism for intermittently supplying power to a load of the type having the property of storing a portion of the energy supplied thereto, without suffering a large incidental power loss from the necessary intermittent dissipation of the energy stored in the load.

Another object of my invention is to provide apparatus incorporating electric discharge devices for supplying power intermittently to a load of the type having the property of storing a portion of the energy supplied thereto, without entailing the loss of the energy stored in the load.

Still another object of my invention is to provide apparatus incorporating electric discharge devices for supplying a load of the type having the property of storing a portion of the energy supplied thereto, wherein the energy stored in the load shall be dissipated at at least as high a rate as the rate at which it is stored.

A further object of my invention is to provide highly efficient apparatus of the type incorporating electric discharge devices for intermittently supplying power to a load of the type having the property of storing a portion of the energy supplied thereto.

A still further object of my invention is to provide highly efficient apparatus for converting power pulsating at a given frequency into power pulsating at a predetermined different frequency.

A more specific object of my invention is to provide an efficient power supply system of the type incorporating electric discharge devices for intermittently supplying current to a load of the inductive type.

Another specific object of my invention is to provide an efficient power supply system without moving mechanical parts for supplying power at a predetermined periodicity to a load of the type having the property of storing a portion of the energy supplied thereto.

An incidental object of my invention is to provide, in a power supply system incorporating an electric discharge device of the type having a starting electrode through which a current is transmitted to initiate a discharge between the principal electrodes, a starting circuit in which the energy consumed shall be a minimum.

Another incidental object of my invention is to provide, in a power supply system of the type incorporating an electric discharge device having a plurality of principal electrodes and a starting electrode through which starting current shall intermittently be transmitted to a cooperating principal electrode, to intermittently initiate the discharge between the principal electrodes, a starting circuit in which the starting current shall be so decreased before its interruption that the objectionable phenomena inherent in the interruption of comparatively large currents shall be suppressed.

More concisely stated, it is an object of my invention to provide a power supply system of the type incorporating electric discharge devices either with starting electrodes or control electrodes that shall operate with high efficiency and that shall be comparatively inexpensive to maintain.

According to my invention, I provide a power supply system of the type incorporating electric discharge devices in which the control potential of the electric discharge devices is so varied that energy is supplied to the load for a predetermined interval of time, and a portion of the energy is stored in the load. After this interval of time the relationship of the load and the power source is so varied that the energy stored in the load is fed back into the power source through the electric discharge devices when the potential of the power source is of opposite polarity to the potential under which the load was energized. This procedure is repeated periodically and the load is thus periodically energized and deenergized without loss of the energy stored in the load.

In accordance with one embodiment of my invention, the control potential for the electric discharge devices is varied by a system incorporating a plurality of current interrupting contacts that are properly motivated. In accordance with another embodiment of my invention, the condition of the electric discharge devices is controlled by shifting the phase of the control potential at the desired periodicity. According to one modification of this embodiment of my invention, the phase shift is attained by the rotation of a suitable movable contactor or commutator in and out of engagement with cooperating fixed contact elements, and in accordance with another modification of this embodiment, the phase shift is attained by utilizing a suitable non-mechanical timing circuit.

As will be explained hereinafter, my invention is applicable both to power supply systems incorporating electric discharge devices of the type having control electrodes, and to power supply systems of the type incorporating electric discharge devices having starting or ignition electrodes, such as the Ignitron tube, for example. The latter discharge devices will be explained more in detail hereinafter in connection with Figs. 3 and 4.

The novel features that I consider characteristic of my invention are set forth with particularity in the appended claims. The invention itself, however, both as to its organization and its method of operation, together with additional objects and advantages thereof, will best be understood from the following description of specific embodiments, when read in connection with the accompanying drawings; in which Figure 1 is a diagrammatic view showing an embodiment of my invention utilizing hot-cathode electric discharge devices;

Fig. 3 is a diagrammatic view showing a modification of my invention in which the electric discharge devices are of the type incorporating starting or make-alive electrodes;

Fig. 4 is a diagrammatic view showing a modification of the system in which the electric discharge devices are of the type incorporating starting or make-alive electrodes;

Figure 1:
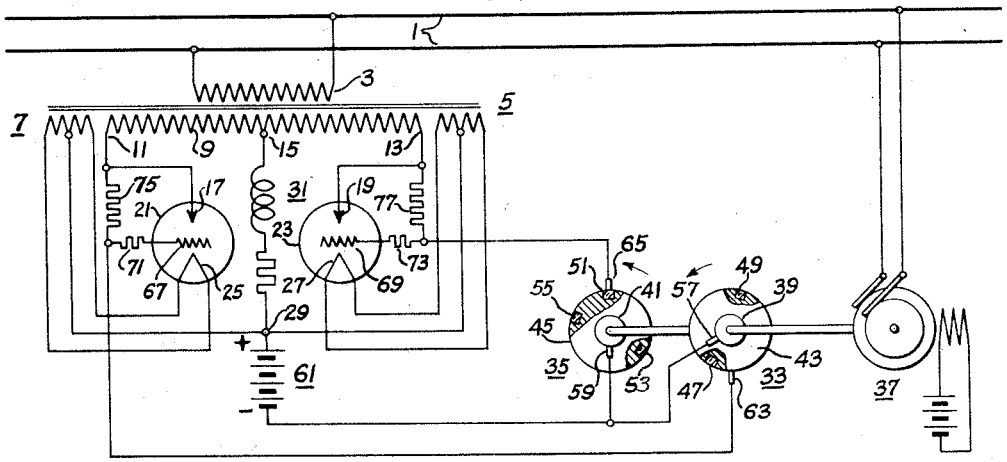

The apparatus shown in Fig. 1 comprises a plurality of power supply bus lines 1 which are supplied with alternating current from a power source (not shown) and to which the terminals of the primary 3 of a transformer 5 are connected. The secondary 7 of the transformer 5 is provided with a section 9 equipped with a plurality of terminal taps 11 and 13 and an intermediate tap 15. The terminal taps 11 and 13 of the section 9 of the secondary 7 are connected directly to the anodes 17 and 19 of a plurality of electric discharge devices 21 and 23. The cathodes 25 and 27 of the electric discharge devices 21 and 23 are of the so-called hot-cathode type, as shown, and are connected to each other at a junction point 29. The intermediate tap 15 of the secondary section 9 is connected to the junction point 29 of the cathodes through an inductive, power-consuming load 31 that is to be supplied with power from the source 1 through the electric discharge devices 21 and 23.

The electric discharge devices 21 and 23 are preferably of the grid-glow type utilized in the system described in my aforesaid Patent No. 1,928,812. I have found that for many purposes the Westinghouse grid-glow tube KU—628 is of considerable utility in the present connection. However, if the requirements of the load circuit permit a smaller tube, the Westinghouse grid-glow tubes KU—627 or KU—610, for example, may be utilized.

In the customary practice of my invention the principal potential has a peak value that is of the order of 100 volts and for the particular electric discharge devices that are preferably utilized, the corresponding limiting control potential is of the order of —2 volts. When the control potential is raised to a value above (or more positive than) this limiting value during the interval during which positive principal potential is supplied, the electric discharge device 21 or 23 for which this condition occurs is energized and remains energized during the remainder of the positive half cycle of principal potential.

The condition of the electric discharge devices 21 and 23 in the system shown in Fig. 1 is controlled from a plurality of rotating contactors or commutators 33 and 35 that are rotated by a synchronous motor 37 energized from the bus lines 1 of the power supply source and, therefore, energized in synchronism with the source. Each of the commutators 33 and 35 is, respectively, equipped with an inner conducting ring 39 and 41 and with an outer conducting ring 43 and 45 provided with a plurality of specially positioned insulating inserts 47 and 49 and 51, 53, and 55. A plurality of brushes 57 and 59, connected to the negative terminal of an auxiliary power source 61 that may be preferably a battery of voltaic cells, engage the inner rings 39 and 41; while a plurality of brushes 63 and 65, connected to the control electrodes 67 and 69 of the electric discharge devices 21 and 23, respectively, through suitable grid resistors 71 and 73, engage the outer rings 43 and 45. The positive terminal of the battery 61 is connected to the junction point 29 of the cathodes 25 and 27.

When the brushes 63 and 65, engaging the outer rings 43 and 45, are in contact with the conducting portions of the rings, the negative terminal of the battery 61, to which the inner brushes 57 and 59 are connected, is connected through the rings and brushes to the control electrodes 67 and 69 of the electric discharge devices 21 and 23. This potential is of such magnitude that the control potential is more negative than the limiting control potential for the electric discharge devices, and the electric discharge devices remain in their deenergized condition. On the other hand, when either of the outer brushes 63 or 65 is engaged by an insulating insert 47 or 49 or 51, 53 or 55, the corresponding control electrode 67 or 69 is disconnected from the auxiliary power source 61, and its potential is raised substantially to the potential of the corresponding anode 17 or 19 to which it is connected through another resistor 75 or 77 of suitable character. When the control electrode 67 or 69 of either electric discharge device 21 or 23 is thus raised to the anode potential, at a time when the anode potential is positive, the electric discharge device becomes energized and transmits current through the load 31.

The insulating segments 47 and 49, and 51, 53 and 55 and the outer brushes 63 and 65 are so disposed relative to each other that the following series of conditions exist in the electric discharge devices 21 and 23:

(1) The electric discharge devices 21 and 23 are alternately energized by interrupting their normally existent negative control potential connections, substantially at the beginnings of each of a plurality of successive half-cycles of positive potential, until a full current of predetermined magnitude is built up in the load 31, as will be explained in connection with Fig. 2.

(2) This full-current condition is necessarily attained during a half-cycle in which positive principal potential is supplied to one of the electric discharge devices (e. g. the device 21) and negative principal potential is supplied to the other discharge device (e. g. the device 23). At the beginning of the next half-cycle of principal potential, when the principal potential supplied to the last-mentioned discharge device 23 becomes positive and the principal potential supplied to the former discharge device 21 becomes negative, the control potential supplied to the discharge device 23 by the battery 61 is not interrupted, as heretofore at the beginnings of each half-cycle of the supply-voltage, but remains negative, and hence the discharge device 23 does not become energized.

(3) By reason of the non-energization of the electric discharge device 23, the discharge is not transferred from the formerly energized electric discharge device 21, and the latter, in spite of the fact that its principal potential is now negative, remains in its energized condition and draws current from the load, returning power to the power-supply line, during nearly all of one half-cycle.

(4) Nearly, but not quite, at the end of the last-mentioned half-cycle of principal potential, the second discharge device 23 (which now has positive principal potential impressed thereon) is energized by the engagement of its corresponding outer brush 65 with an insulating segment such as 49, resulting in the removal of the negative potential from its control electrode 69.

(5) The latter electric discharge device 23, therefore, becomes energized and shunts out the former electric discharge device 21, extinguishing the device 21, and for the remainder of its positive half-cycle of principal potential, the device 23 feeds current into the load 31.

(6) However, since the principal potential on the discharge device 23, as supplied by the secondary of the transformer, soon becomes negative, this discharge device 23 also begins to draw current from the load and thus further decreases the current passing through the load, until nearly at the end of its half-cycle of negative principal potential, when the former device 21 is again energized and repeats the performance just described for the device 23.

(7) This procedure is repeated until the current in the load is substantially zero.

(8) At this juncture, or at a predetermined interval later, one of the electric discharge devices 21 is again energized substantially at the beginning of its positive half cycle of principal potential and the load 31 is again supplied with current from the power source.

It is to be noted that in accordance with the above enumerated steps the load 31 is first supplied with power under the positive electromotive force of the power source and subsequently it gives up its stored energy when the electromotive force of the power source is negative. Since, in an ordinary power supply system the positive half wave of output potential is equal in magnitude to the negative half wave of output potential, the load 31 may be deenergized at a rate which is at least as high as the rate at which it is energized. That is to say, since the force supplying power to the load is of the same magnitude as the force withdrawing useful power from the load, to say nothing of the work being done by or in the load, the demagnetizing operation may take place at as great a rate as the magnetizing operation, or even at a greater rate and the difficulty which arises in the systems constructed in accordance with my earlier application does not exist.

It is seen that, in accordance with the above procedure, the load 31 is supplied intermittently with power and intermittently feeds back power to the power source. In this manner the exciting coil of a vibrating system such as a shaker screen, may be intermittently energized at a high efficiency.

The proper spacing of the insulating segments on the outer rings 43 and 45 is shown in detail in Fig. 1. The rings 43 and 45 are rotated in a counter-clockwise direction. The cycle of operations may be regarded as beginning with the engagement of the upper insulating segment 51 of the left hand ring 45 with the brush 65 connected to the control electrode 69 of the right-hand electric discharge device 23. The engagement of the two contact elements 51 and 65 takes place at the beginning of the positive half cycle of principal potential applied to the right hand electric discharge device 23. Current is thereupon supplied through the electric discharge device 23 to the load 31.

The next element to be engaged by a brush is the lower insulating insert 47 of the right-hand outer ring 43 which is engaged by the brush 63 connected to the control electrode 67 of the left hand electric discharge device 21. The former insulating insert 51 and the latter insulating segment 47 are so spaced with reference to each other and to the corresponding brushes 65 and 63 that the engagement of the brush 63 with the insert 47 takes place at the beginning of the half cycle of positive principal potential applied to the left-hand electric discharge device 21 and consequently at the beginning of the negative half cycle of principal potential applied to the right hand electric discharge device 23. The left-hand electric discharge device 21 is, therefore, energized while the right-hand electric discharge device 23 is deenergized, and the supply of current to the load 31 is continued.

At the beginning of the next successive half cycle of potential the brush 65 that is connected to the control electrode 69 of the right-hand electric discharge device 23 is engaged by the insulating insert 53 of the left-hand outer ring 45. The right-hand electric discharge device 23 is, therefore, reenergized while the left hand device 21 is deenergized, and the current which is transmitted to the load 31 is further increased.

At the beginning of the next subsequent half cycle of principal potential, neither of the brushes 63 or 65 is engaged by an insulating segment, and the inductive load 31 now supplies energy to the power source through the electric discharge device 23 that was last energized. This condition continues until nearly the end of that half cycle of principal potential. At this point, the remaining insulating segment 49 of the right-hand outer ring 43 is engaged by the brush 63 which is connected to the control electrode 67 of the left-hand electric discharge device 21, and the latter device is energized. When it is so energized, the left hand device 21 shunts out the other electric discharge device 23 and the latter device is deenergized. The left hand electric discharge device 21 now continues in its energized condition during the remainder of the half cycle in which it has been energized, and during the subsequent half cycle in spite of the fact that the principal potential supplied by the power source takes on a negative polarity during the latter half cycle. The load 31 supplies power through the device 21 to the power source during the latter half cycle of principal potential. When the end of this half cycle is approached, the brush 65 which is connected to the control electrode 69 of the right-hand electric discharge device 23 is connected to the remaining insulating segment 55 of the left-hand outer ring, and this electric discharge device is energized, nearly at the end of its positive half cycle of principal potential, and shunts out the other electric discharge device 21. It supplies current to the load for the short interval remaining of the positive half cycle of principal potential applied to it and then draws current from the load 31. At this point the current in the load 31 is reduced substantially to zero and the above-described series of steps is repeated.

Figure 2:
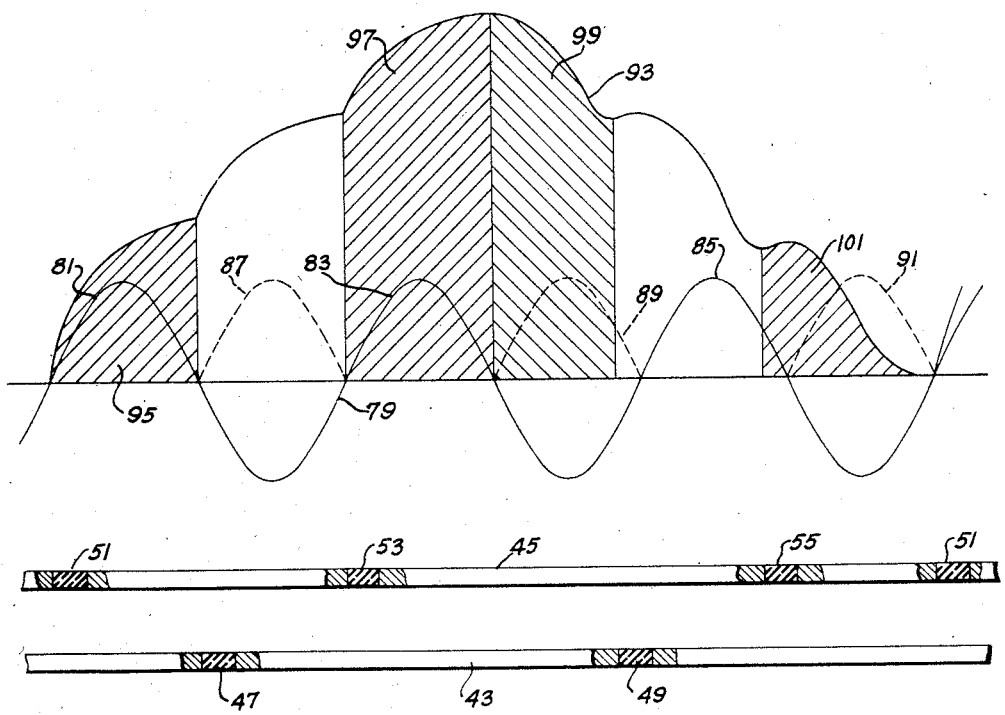
Fig. 2 is a plot illustrating the operation of the system shown in Fig. 1.

The operation of the system is illustrated in detail in Fig. 2. The principal potential applied to the right-hand electric discharge device 23 is shown as a full-line sine curve 79 having a plurality of positive half waves 81, 83 and 85, plotted against time. The positive half waves of principal potential applied to the left-hand electric discharge device 21 are shown as broken-line half-wave sine curves 87, 89, and 91. The current supplied to the load 31 is shown as a full line curve 93 that extends above the curves representing the principal potentials supplied to the electric discharge devices 21 and 23. The outer rings 43 and 45 of the commutators 33 and 35 are plotted developed, and in the plot the insulating inserts 47, 49, 51, 53, and 55 are shown, with reference to the half waves of principal potential, at the points at which they are engaged by the brushes 63 and 65.

It is to be noted in Fig. 2 that the first upper insulating segment 51 of the left-hand outer contactor ring 45 is shown in a position corresponding to the beginning of the positive half cycle of principal potential. At the starting point represented in Fig. 2, the insulating segment 51 is engaged by the brush 65 in Fig. 1. The electric discharge device 23 to which the positive principal potential is applied at this point becomes energized and supplies current to the load 31, gradually building up in opposition to the inductance of the load. The current supplied through the electric discharge device 23 is represented in Fig. 2 by the shaded area 95 under the load current curve 93. The insulating insert 47 of the right-hand contact ring 43 in Fig. 1 subsequently engages its corresponding brush 63 at the beginning of the positive half wave 87 of principal potential which is supplied to the other electric discharge device 21 as shown in Fig. 2. At this point, the electric discharge device 21 is energized and current is supplied to the load through it, building up still further, as shown in Fig. 2. At the next half wave of principal potential, an insulating insert 53 on the left hand contactor ring 45 is engaged, and current is supplied to the load 31 as represented by the shaded area 97 under the current curve 93.

At the beginning of the next half wave 89 of principal potential, neither of the electric discharge devices 21 or 23 is energized by variation or interruption of the control potential, which is normally strongly negative, by reason of the connection of the battery 61. However, the right-hand electric discharge device 23, which was energized at the beginning of the half cycle 83, remains in its energized condition and continues to draw current from the load, deriving its principal voltage from the collapsing magnetic lines of force in the inductive impedance of the load. This condition is represented by the shaded area 99 under the current curve 93. By reason of the fact that the load 31 supplies energy to the power source, besides consuming energy within itself, the current passing through the load is decreased and it is so shown in Fig. 2. Near the end of the half cycle 89 of positive principal potential applied to the left-hand electric discharge device 21, the brush 63 on the right-hand outer ring 43 in Fig. 1 is engaged by the insulating insert 49. The left-hand electric discharge device 21 is, therefore, energized and for a short interval of time current is supplied through it to the load 31. This condition results in an increase in the current transmitted through the load, as is illustrated by the rise of the current curve 93 in the region following the point at which the left-hand electric discharge device is energized. However, the principal potential applied to the now energized electric discharge device 21 from the source soon becomes negative and energy is supplied to the power source by the load 31. The current in the load is, therefore, further decreased.

Finally, the right-hand electric discharge device 23 in Fig. 1 is energized substantially at the end of its positive half cycle 85 of positive principal potential, and for a short interval of time the current in the load increases, as shown by the rise in the current curve 93 in Fig. 2. However, the principal potential applied to the right-hand electric discharge device 23 from the source soon becomes negative and the current passing through the load falls to substantially zero value as shown in the shaded area 101 under the current curve 93. After this condition occurs the right-hand electric discharge device 23 is again energized substantially at the beginning of its positive half cycle and the above-described series of steps is repeated.

It is to be noted that the synchronous motor 37 in the system shown in Fig. 1 is of the type incorporating an externally-excited field. When a motor of this type is synchronized with a power source the angular position of any point on the rotor bears a fixed relationship to the half waves of alternating potential that are supplied to the armature. Consequently, if the commutators 33 and 35 are properly positioned on the rotor shaft, the system will always start and operate with the brushes 63 and 65 engaging the inserts 47, 49, 51, 53, and 55 at instants corresponding to the points at which it is desired that the brushes should engage the inserts for proper operation.

In Fig. 3 my invention is shown as applied to a system incorporating electric discharge devices 103 and 105 of the make-alive type, such as the Ignitron tube. An electric discharge device of this type comprises, in general, a vaporizable reconstructing cathode of a material such as mercury or tin, and an anode to cooperate with the cathode. A poorly conducting make-alive electrode composed of carborundum, boron carbide, silicon carbide, boron, silicon, a glow bar rod, Nernst filament material, ferro-silicon, galena or a number of other similar materials, is immersed in the mercury or tin, and when a so-called "starting" current of a predetermined magnitude is caused to flow from the starting electrode to the cathode, a discharge is initiated between the principal electrodes. By a poorly conducting make-alive electrode I means an electrode having a resistivity of not greater than $10^5$ ohms per centimeter cube.

In the system shown in Fig. 3, the make-alive electric discharge devices 103 and 105 are connected to the secondary 7 of the transformer 5 in the same manner as the corresponding electric discharge devices 21 and 23 are connected in the system shown in Fig. 1. The anodes 107 and 109 of the electric discharge devices 103 and 105 are, respectively, connected to the terminal taps 11 and 13 of the secondary 7, while the cathodes 111 and 113 of the electric discharge devices are connected to each other and their common junction point 29 is connected to the intermediate tap 15 of the secondary through the load 31.

A plurality of commutators 115 and 117 are associated with the make-alive electrodes 119 and 121 of the electric discharge devices 103 and 105. The commutators 115 and 117 might be, so to speak, regarded as the electrical negatives of the commutators 33 and 35 associated with the control electrodes 67 and 69 of the electric discharge devices 21 and 23 of the system shown in Fig. 1. The inner elements in the commutators are conducting rings 39 and 41 as in the former system. However, the outer elements comprise insulating rings 123 and 125 in which are inserted a plurality of conducting inserts 127 and 129 and 131, 133 and 135 which are connected to the inner rings 39 and 41, respectively. The conducting inserts 127, 129, 131, 133, and 135 are located at points in the rings 123 and 125 that correspond to the positions of the insulating inserts 47, 49, 51, 53, and 55 in the outer rings 43 and 45 of the system shown in Fig. 1. The conducting inserts 127 and 129 are conductively connected to the corresponding inner ring 39 while the conducting inserts 131, 133 and 135 are connected to the corresponding inner ring 41.

The brushes 57 and 59 that are in engagement with the inner conducting rings 39 and 41 are connected to the respective anodes 107 and 109 of the electric discharge devices 103 and 105, while the brushes 63 and 65 that are in engagement with the outer rings 123 and 125 are connected to the make-alive electrodes 119 and 121 of the respective electric discharge devices through suitable current limiting resistors 137 and 139. When a brush 63 or 65, connected to a make-alive electrode 119 or 121, engages a conducting insert 127 or 129, or 131, 133, or 135, the make-alive electrode is connected to one of the terminals of the power source and current is transmitted through the electrode and through the corresponding cathode 111 or 113. If the current is of proper magnitude and polarity, the corresponding electric discharge device 103 or 105 is energized or caused to become conducting.

For the present purpose let it be assumed that, at the instant corresponding to the position of the elements as shown in Fig. 3, the right-hand terminal 13 of the secondary 7 of the transformer 5 is positive relative to the intermediate tap 15 and the left-hand terminal 11 is negative relative to the intermediate tap. At this instant the brush 65 connected to the make-alive electrode 121 of the right-hand electric discharge device 105 is engaged by the conducting segment 131 and current is transmitted through the make-alive electrode in a proper direction for ignition. The right-hand electric discharge device 105 having at this time the proper principal potential applied thereto is, therefore, energized when the make-alive current attains the starting value, and current is supplied to the load 31.

Since the circuit shown in Fig. 3 involves a feature of considerable importance, it may be well to digress here to explain this feature. It is to be noted that each of the make-alive circuits is connected at one of its terminals to the anode 107 or 109 of its associated electric discharge device 103 or 105, and at the other terminal it is connected to the cathode 111 or 113 of the associated electric discharge device. Consequently, when one of the electric discharge devices, 105 for example, is energized, the corresponding make-alive network is shunted out, and the current which was originally transmitted from the then positive terminal 13 of the secondary 7, through the contact elements 59, 41, 131, and 65 thence through the make-alive electrode 121 of the right-hand electric discharge device 105, the cathode 113 of this device and the load 31, to the intermediate tap 15 of the secondary, is now transmitted between the principal electrodes 109 and 113 of the right-hand electric discharge device 105, and thence through the load 31 to the intermediate terminal 15 of the secondary. The current supplied to the make-alive electrode 121 is, therefore, necessarily decreased after the electric discharge device is energized, and hence the current that must be interrupted at the contactor 117 by the disengagement of the conducting insert 131 from the brush 65 which is connected to the make-alive electrode 121, is comparatively small. In this manner, sparking between the contacts and the brushes, which would deleteriously affect these elements, is suppressed, and the magnitude of the make-alive current drawn by the high resistance starting circuit is maintained at a minimum. It is to be noted that the latter advantage is of considerable importance since, in make-alive electric discharge devices of this type, the starting current may have a magnitude as great as 5 or 10 amperes. By utilizing the system shown in Fig. 3 with the feature described hereinabove, not only are the contact members of the commutators 115 and 117 protected from disintegration, but the starting electrodes are prevented from becoming excessively heated, and considerable power is saved.

To revert now to the essential features of the system shown in Fig. 3, the current transmitted between the principal electrodes 109 and 113 of the right-hand electric discharge device 105, when once initiated, continues during the remainder of the positive half cycle of principal potential impressed on this device. Since the potential drop between the anode 109 and the cathode 113 of the electric discharge device 105 is comparatively small when the device is energized, the cathode 113 is, during this interval, at substantially the potential of the anode 109 and consequently at the potential of the right-hand terminus 13 of the secondary 7.

At the beginning of the subsequent half cycle of principal potential, a conducting insert 127 in the right-hand ring 123 is engaged with the brush 63 which is connected to the left-hand starting electrode 119. The difference of potential between the starting electrode 119 and its corresponding cathode 111 is now substantially equivalent to the potential difference between the two terminal taps 11 and 13 of the secondary 7 of the transformer 5. When the circuit through the starting electrode 119 is completed by the engagement of the conducting insert 127 and the brush 63 connected to the starting electrode, sufficient current is transmitted through the starting electrode to energize the left-hand electric discharge device 103, and when it is energized, current is transmitted through it and to the load 31.

The above series of steps are repeated until suitable current is built up in the load 31. After this condition is attained, the inserts 129 and 135, being properly positioned in the rings 123 and 125, engage the brushes 63 and 65 at instants corresponding to the latter portions of the positive half cycles of principal potential as previously explained, and the electric discharge devices 103 and 105 are so energized as to draw current from the load 31 and supply it to the power source in the manner explained with regard to the system shown in Fig. 1.

The system shown in Fig. 4 is largely similar to the system shown in Fig. 3. Experiments with make-alive electric discharge devices have demonstrated that their operation is most satisfactory when current is transmitted through the starting electrode only in a direction proper to ignition, and is not transmitted in the opposite direction. For this reason, the preferred practice has been to energize the make-alive circuit of an electric discharge device through an asymmetric electric discharge device preferably of the hot cathode grid-glow type.

A system in which this procedure is followed is shown in Fig. 4. In this system, the make-alive electric discharge devices 103 and 105 are connected to the secondary 7 of the transformer 5 and to the load 31 in the same manner as the corresponding devices are connected in the system shown in Fig. 3. However, a plurality of hot-cathode electric discharge devices 149 and 151 are provided, having principal electrodes 141, 143 and 145, 147 which are connected in series with the respective make-alive electrodes 119 and 121, the corresponding cathodes 111 and 113 of the electric discharge devices 103 and 105, and the corresponding terminals 11 and 13 of the secondary 7. The hot-cathode electric discharge devices 149 and 151 have control electrodes 153 and 155 which are supplied with potential from a system of commutators 33 and 35 and a battery 61 that are identical in structure and arrangement to the corresponding elements of the system shown in Fig. 1. The hot-cathode electric discharge devices 149 and 151 are energized in the same sequence as the devices 21 and 23 of the system shown in Fig. 1, and provide for the excitation of the make-alive electric discharge devices 103 and 105 in the proper sequence to feed the load 31 and to draw current from the load, as has been explained hereinabove.

When a hot-cathode electric discharge device 149 or 151 is energized, current is transmitted through it and through the make-alive electrode 119 or 121 of the corresponding make-alive electric discharge device 103 or 105. The make-alive electric discharge device is, therefore, energized and supplies power to the load 31 or draws current therefrom in the manner already outlined.

It is to be noted that the anodes 141 and 145 of the hot-cathode electric discharge devices 149 and 151 are each connected to an anode 107 or 109 of the corresponding make-alive electric discharge device 103 or 105, while the principal circuits of the make-alive electric discharge devices are connected in shunt with the corresponding make-alive circuits including the hot-cathode electric discharge devices. When a make-alive electric discharge device is energized therefore, the corresponding hot-cathode electric discharge device and its cooperative circuit is shunted out and deenergized. This feature of the system is similar to the feature discussed hereinabove and is important since, by utilizing it, a saving of considerable power may be effected.

It may aid to an understanding of the operation, to follow the circuits of the system shown in Fig. 4 in detail for one cycle of operation of the system. The hot-cathode electric discharge devices 149 and 151 are energized at the beginning or near the end of a half cycle of positive principal, potential depending on the relative disposition of the brushes 63 and 65, and the insulating inserts 47, 49, 51, 53, and 55. Assume, for example, that the right-hand hot-cathode electric discharge device 151 is energized. Current is transmitted through a starting circuit extending from the right-hand terminal 13 of the secondary 7 of the transformer 5, through the principal circuit of the hot-cathode electric discharge device 151, the make-alive electrode 121 of the right-hand electric discharge device 105, the cathode 113 of this discharge device, and the load 31, and thence to the intermediate terminal 15 of the secondary of the transformer. When the current transmitted through the make-alive electrode 121 attains the proper magnitude, the right-hand electric discharge device 105 is energized, and current is transmitted between the principal electrodes 109 and 113 of the device and through the load 31. The potential difference between the anode 109 and the cathode 113 of the right-hand electric discharge device 105 and, therefore, the potential difference between the anode 145 and the cathode 147 of the corresponding hot cathode electric discharge device 151 is reduced to a small value and the latter device is deenergized. The same series of steps is repeated for the system on the left-hand side, and current is supplied to the load 31 from the power source and from the load to the power source in the manner explained hereinabove.

While hot cathode electric discharge devices of all types may be utilized in the system shown in Fig. 4, in practice I prefer tubes having the properties of the Westinghouse KU—627 or KU—628 grid-glow tubes.

Figure 5:
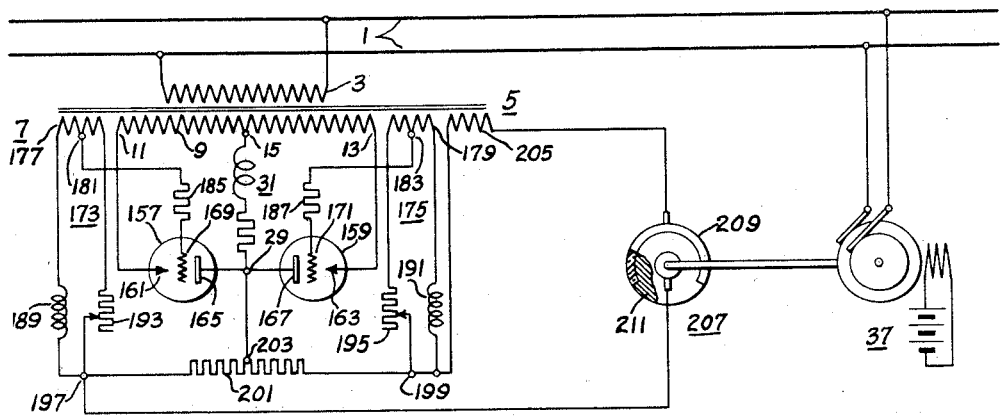
Fig. 5 is a diagrammatic view showing a modification of my invention in which the desired result is attained by phase shift of the control potential or of the starting current.

In the system shown in Fig. 5, the necessary variation in the grid or control potential is provided by phase shift circuits rather than by magnitude variation circuits. In this view the electric discharge devices 157 and 159 that are illustrated as supplying the load are shown in a symbolical form representative of any device that might be utilized. In this system, as in the systems shown in the other views, various types of electric discharge devices might be utilized, depending on the particular purpose for which the system is provided. Among the available electric discharge devices are gas-filled devices of the type having hot cathodes or vaporizable reconstructing cathodes (such as cathodes of mercury, tin, or of alkali metals), gas-filled devices having cathodes of the non-reconstructing type, and high vacuum devices of all types.

In the system shown in Fig. 5 the electric discharge devices 157 and 159 are connected to the secondary section 9 of the transformer 5 and to the load 31 in the same manner as the electric discharge devices 21 and 23 are connected in the system shown in Fig. 1. The anodes 161 and 163 of the electric discharge devices 157 and 159 are connected to the terminals 11 and 13 of the secondary section 9, while the cathodes 165 and 167 are connected to each other and their junction point 29 is connected to the center tap 15 of the section 9 through the load 31.

The control electrodes 169 and 171 of the devices 157 and 159 are not supplied with potential through contactor elements such as the elements of the system shown in Fig. 1 but are coupled to a plurality of similar phase-shift circuits or networks 173 and 175.

Each of the phase shift circuits 173 and 175 comprises a transformer secondary section 177 and 179 provided with an intermediate tap 181 and 183 which is connected to a control electrode 169 and 171 of the respective electric discharge devices 157 and 159, through a suitable grid resistor 185 and 187. A network comprising an inductor 189 and 191 and a resistor 193 and 195 connected in series with the inductor, is connected to the terminal taps of each section 177 and 179 of the secondary 7. The junction point 197 and 199 of each of the sets of resistor 193 and 195 and inductor 189 and 191 is connected to the terminals of a resistor 201 which has an intermediate tap 203 connected to the common junction point 29 of the cathodes 165 and 167.

The resistor 201 last-mentioned is capable of being alternately connected to and disconnected from an additional section 205 of the secondary 7 of the transformer 5, through a commutator 207 provided with an insulating segment 209 and a conducting segment 211, the commutator being rotated by the synchronous motor 37. When the resistor 201 is connected to the transformer section 205, it is connected directly across the section.

Figure 6:
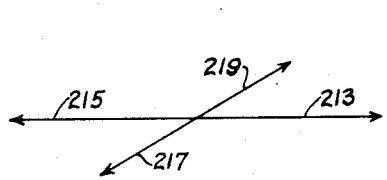
Fig. 6 is a vector diagram illustrating one feature of the operation of the system shown in Fig. 5.
Figure 7:
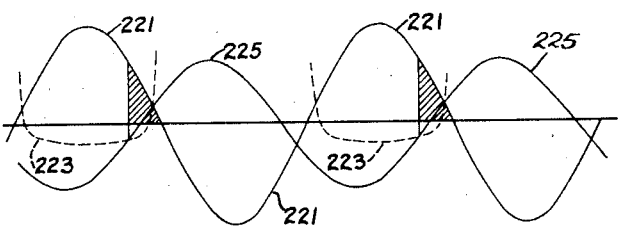
Fig. 7 is a graph corresponding to Fig. 6.

When the resistor 201 is disconnected from the secondary section 205, the potential supplied between each control electrode 169 or 171 and its associated cathode 165 or 167 is determined solely by the phase shift circuits 173 or 175, respectively, and by the relationship of the magnitudes of the resistors 193 and 195 and the inductors 189 and 191 of the circuits. However, when the resistor 201 and the transformer section 205 are connected to each other, the control potential of the electric discharge device is varied by the application of the potential output of the section 205. Figs. 6 and 7 illustrate, vectorially and graphically, respectively, the condition of the electric discharge devices 157 and 159 when the resistor 201 is disconnected from the secondary section 205.

In Fig. 6, the principal potentials impressed on the electric discharge devices 157 and 159 are represented by horizontal vectors 213 and 215. The potentials impressed between the control electrode and the cathode of the electric discharge devices when the section 205 is disconnected from the system, are substantially the potentials impressed between the opposite points 181, 197 and 183, 199 of the phase shift networks 173 and 175, and are represented by oblique vectors 217 and 219. The vectors 217 and 219 lag in phase behind the corresponding horizontal vectors 213 and 215 by considerable angles predetermined by the relationship of the impedances in each of the circuits 173 and 175. The phases of the principal potentials 213 and 215 applied to the two electric discharge devices 157 and 159 are maintained exactly opposite to each other, and hence the control-potential vectors 217 and 219 are necessarily colinear, being equal and opposite since the networks 173 and 175 are alike. The actual condition which results in either of the electric discharge devices when the vectorial relationship is as shown in Fig. 6 is illustrated in Fig. 7.

In Fig. 7 the principal potential supplied to the two electric discharge devices 157 and 159 is represented as a sine curve 221, plotted against time. The portion of the curve above the axes of abscissæ may be regarded as the positive principal potential applied to one device 157, say, while the portion of the curve below the axes of abscissæ may be regarded as the corresponding positive principal potential applied to the other electric discharge device 159. The limiting control-potential curve corresponding to the positive principal potential impressed on one electric discharge device 157 is shown as a broken-line curve 223 intersecting the positive principal-potential half-ways. While the limiting control-potential curve is shown only for one of the electric discharge devices, it is apparent that a similar curve may be drawn for the other electric discharge device 159. The control potential is represented as a sine curve 225 shifted in phase with respect to the principal-potential curve by a considerable angle. The control-potential curve 225 intersects the limiting control-potential curve 223 near the ends of the positive half-waves of the principal-potential curve 221 applicable to the corresponding electric discharge device 157. It is to be noted that if the potentials applied to the electric discharge devices 157 and 159 correspond in relationship to the curves shown in Fig. 7, each of the electric discharge devices will be energized nearly at the end of each of a succession of positive half cycles of principal potential.

When the secondary section 205 is connected across the resistor 201, an additional in-phase potential is superimposed on each of the potentials provided by the phase-shifting circuits 173 and 175. This situation is represented vectorially in Fig. 8 and graphically in Fig. 9.

Figure 8:
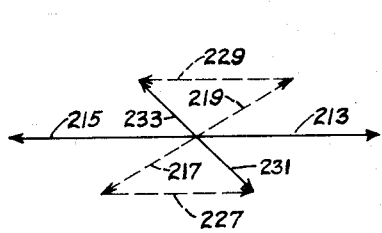
Fig. 8 is a vector diagram illustrating another feature of the operation of the system shown in Fig. 5.

In Fig. 8 the principal potentials applied to the electric discharge devices are represented by the opposite colinear vectors 213 and 215. The potentials applied to the control electrodes when the secondary section of the transformer is not connected in the system are represented by a plurality of broken-line vectors 217 and 219 parallel to the corresponding vectors of Fig. 6. The potentials superimposed by the secondary section 205 are represented by a plurality of broken-line vectors 227 and 229 parallel to, and in the direction of, the corresponding principal-potential vectors 213 and 215. The total potentials impressed on the control circuits of the respective electric discharge devices 157 and 159 are, therefore, represented by the sums of the two sets of vectors 217 and 227 and 219 and 229 and, therefore, by the vectors 231 and 233 which lag in phase behind the principal-potential vectors 213 and 215, respectively, by an angle that is considerably smaller than the phase angles of the vectors 217 and 219.

Figure 9:
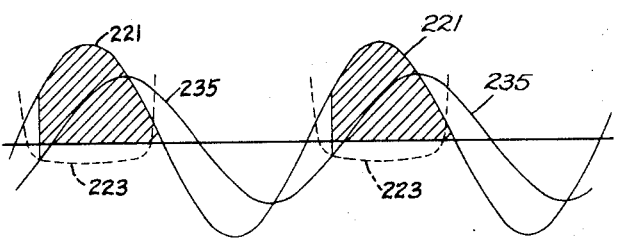
Fig. 9 is a graph corresponding to Fig. 8.

In the corresponding graphic diagram shown in Fig. 9, the control-potential curve is now shown at 235, intersecting the limiting control-potential curve 223 at points near the beginnings of the positive half-waves of the principal-potential curve 221, and the current transmitted through the electric discharge devices 157 and 159 from the power source is correspondingly of considerable magnitude.

As the commutator 207 is rotated, the control system varies from a condition corresponding to Fig. 8 and Fig. 9 to a condition corresponding to Fig. 6 and Fig. 7, and current is alternately supplied to the load 31 and drawn from the load in a manner corresponding to that discussed hereinabove in connection with the systems shown in Figs. 1, 3, and 4. It is to be noted that if the curves shown in Fig. 9 and Fig. 7 are placed end to end, the resulting curve will correspond to the curve shown in Fig. 2. As long as the system is in the condition represented in Fig. 9, power is supplied to the load 31 through the electric discharge devices 157 and 159. However, when the system is reverted to a condition such as is shown in Fig. 7, any power that is stored in the inductance of the load 31 is drawn therefrom and fed back into the power source through the electric discharge devices 157 and 159.

Figure 10:
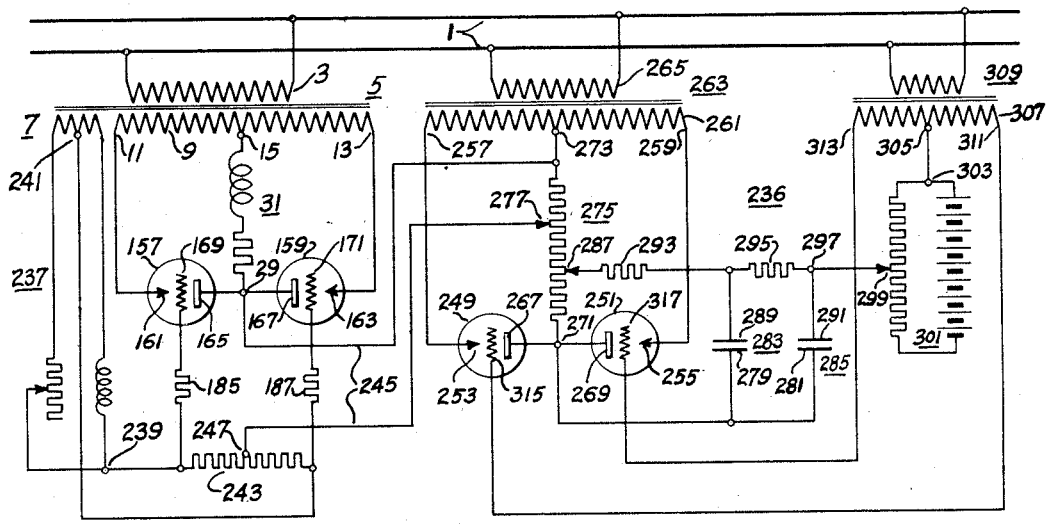
Fig. 10 is a diagrammatic view showing a further modification of my invention in which moving mechanical parts are not utilized.

In the system shown in Fig. 10, the object of my invention is accomplished without the use of movable commutators or contactors. In this system the variation in control potential is attained by utilizing a timing circuit 236 of the type that is described in detail in a copending application Serial No. 650,517 filed January 6, 1933 by William W. Viebahn and assigned to the Westinghouse Electric & Manufacturing Company.

In the system shown in Fig. 10, the electric discharge devices 157 and 159 through which the load 31 is energized are connected to the load and to a secondary section 9 of the transformer 5 in the same manner as the corresponding devices of the systems shown in Figs. 1, 3, 4, and 5. That is to say, the anodes 161 and 163 of the electric discharge devices are connected to the terminals 11 and 13 of the secondary section 9 while the cathodes 165 and 167 are connected together and their junction point 29 is connected to the intermediate tap 15 of the secondary section through the load 31. Potential is supplied between the control electrodes 169 and 171 and the associated cathodes 165 and 167 principally by a phase-shifting circuit 237 of the type incorporated in the system shown in Fig. 5. One output terminal 239 of the phase-shift circuit 237 is connected to the control electrode 169 of one of the electric discharge devices 157 through the usual grid resistor 185 and the other output terminal 241 of the circuit is connected to the control electrode 171 of the other electric discharge device 159, through the resistor 187.

A resistor 243 of suitable magnitude is connected between the control electrodes 169 and 171 of the electric discharge devices 157 and 159. The varying potential is intermittently supplied from the timing circuit 236, the output leads 245 of which are connected between the junction point 29 of the cathodes 165 and 167 of the electric discharge devices 157 and 159 and an intermediate tap 247 of the resistor 243 connected between the control electrodes.

The timing circuit 236 comprises a plurality of electric discharge devices 249 and 251 which may be of the type utilized in the other portion of the system or may be hot-cathode gas-filled electric discharge devices, hot-cathode high-vacuum electric discharge devices, or any other suitable devices. However, it is to be noted that preferably the electric discharge devices 249 and 251 should be of the gas-filled type and should have an abrupt characteristic similar to the characteristic of the other electric discharge devices utilized in the system.

The anodes 253 and 255 of the electric discharge devices 249 and 251 are connected to the terminal taps 257 and 259 of a secondary 261 of a transformer 263, the primary 265 of which is supplied with power from the bus lines 1. The cathodes 267 and 269 of the devices are connected to each other and their junction point 271 is connected to the intermediate tap 273 of the secondary 261 through a potentiometer 275. The output leads 245 of the timing circuit 236 are connected to a movable tap 277 of the potentiometer 275 and to the central tap 273 of the secondary 261. When either of the electric discharge devices 249 or 251 in the timing circuit 236 is energized, current is transmitted through the potentiometer 275 and a potential is impressed between the control electrodes 169 and 171 and the cathodes 165 and 167 of the electric discharge devices 157 and 159.

The common junction point 271 of the cathodes 267 and 269 of the electric discharge devices 249 and 251 in the timing circuit 236 is connected to the lower or positive plates 279 and 281 of a plurality of biasing-potential capacitors 283 and 285 while an additional intermediate tap 287 of the potentiometer 275 is connected to the upper or negative plates 289 and 291 of the capacitors through a plurality of resistors 293 and 295. One of these resistors 293 is connected between one capacitor 283 and the movable tap 287 while the other of the resistors 295 is connected between the two capacitors 283 and 285. The junction point 297 of the capacitor 285 and the latter resistor 295 is connected to the movable tap 299 of a unidirectionally energized biasing potentiometer 301, the positive terminal 303 of which is in turn connected to the intermediate tap 305 of the secondary 307 of an additional transformer 309 that is energized from the bus lines 1. The terminal taps 311 and 313 of the secondary 307 are connected to the control electrodes 315 and 317 of the electric discharge devices 249 and 251.

The timing feature of the circuit 236 is dependent on the relationship between the biasing-potential capacitors 283 and 285 and the resistors 293 and 295. The operation of the system is described in detail in the above-mentioned Viebahn application. However, it may be explained shortly here.

Assume for the purpose of the present explanation that the biasing-potential capacitors 283 and 285 are substantially in uncharged condition. The control potential supplied to the electric discharge devices 249 and 251 by the biasing potentiometer 301 and the transformer-secondary 307 is not sufficiently negative to block the energization of either one of the electric discharge devices. Assume then that the principal potential on the right-hand electric discharge device 251 is positive. In such a case the right-hand electric discharge device is energized and current is transmitted through the potentiometer 275. By reason of the current thus transmitted, a difference of potential is impressed between the output leads 245 of the timing system. When the principal potential changes in polarity and the left-hand electric discharge device 249 has positive principal potential impressed thereon it is energized and the supply of current to the potentiometer continues.

As the timing-circuit electric discharge devices 249 and 251 are energized, a potential difference exists between the common cathode terminal 271 and the movable tap 287 of the potentiometer 275. The biasing-potential capacitors 283 and 285 are, therefore, charged, the lower plates 279 and 281 accumulating a positive charge while the upper plates 289 and 291 accumulate a negative charge.

The left-hand capacitor 283 is moreover charged to a greater potential than the right-hand capacitor 285 since the resistance in series with the former is less than the resistance in series with the latter.

As the electric discharge devices 249 and 251 continue to supply current to the potentiometer 275, a negative potential is superimposed on the biasing potential and the alternating potential that are impressed between the control electrodes 315 and 317 and the cathodes 267 and 269 of the timer-circuit electric discharge devices 249 and 251, through the biasing potentiometer 301 and the secondary 307 of the transformer 309, respectively. When the negative potential attains a proper value, the electric discharge devices 249 and 251 are deenergized and the supply of current to the potentiometer 275 ceases. The capacitors 283 and 285 are then discharged through the resistors 293 and 295 and the potentiometer 275. The control potentials impressed on the electric discharge devices 249 and 251 eventually attain such values that the electric discharge devices are again energized. This series of operations is repeated continuously as long as power is applied to the system.

Although certain of the elements such as the biasing potential and the alternating potential supplied to the control circuits of the timing electric discharge system 236 do not concern the present invention and are explained in detail in the above-mentioned Viebahn application, a word might be said about them here.

Two biasing-potential capacitors 283 and 285 are utilized instead of one, in order to extend the periods during which the electric discharge devices 249 and 251 are deenergized and energized. It is to be noted that the right-hand capacitor 285, which is connected to the control electrodes 315 and 317, determines when the control electrodes will attain negative potentials of such magnitude as to interrupt the discharging condition of the electric discharge devices. The left-hand capacitor 283, however, is maintained at a higher potential difference than the right-hand capacitor 285 and maintains the latter in charged condition for an interval after the charging potential has been removed. Consequently, when the electric discharge devices are deenergized, the right-hand capacitor 285 is not at once discharged to produce a re-energized condition in the electric discharge devices 249 and 251 but remains in charged condition for an interval dependent on the magnitudes of the other elements in the system.

The biasing potential of the potentiometer 301 is provided in the timing system for the purpose of extending its range. The alternating potential applied by the secondary 307 of the transformer 309 is in opposite phase to the alternating principal potential supplied to the electric discharge devices 249 and 251 and is provided for the purpose of increasing the sharpness of the variation in the conditions of the timing system 236.

Figure 11:
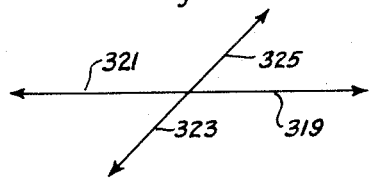
Fig. 11 is a vector diagram illustrating a feature of the operation of the system shown in Fig. 10.
Figure 12:
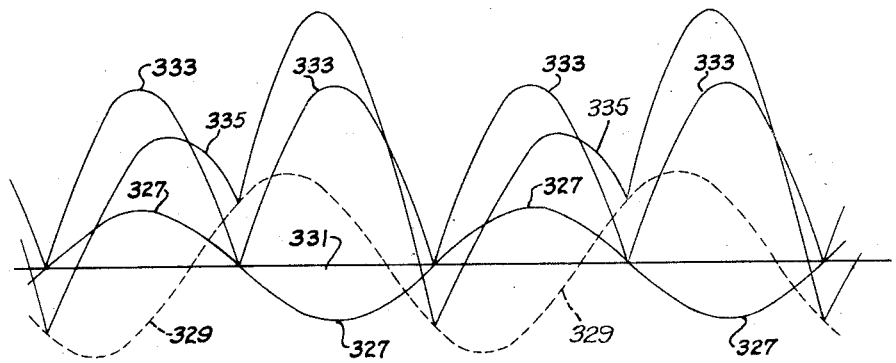
Fig. 12 is a graph illustrating the operation of the system shown in Fig. 10.

The operation of the system is illustrated in the vectorial diagram of Fig. 11 and the graph of Fig. 12. When the electric discharge devices 249 and 251 of the timing circuit 236 are deenergized the junction point 29 and the intermediate tap 247 are substantially at the same potential and the phase-shift circuit 237 determines the potential relationship of the electric discharge devices 157 and 159 in the power supply system and the principal potential is related to the control potential in accordance with the vector diagram of Fig. 11.

In Fig. 11, the principal potentials on the two electric discharge devices are represented as opposite colinear horizontal vectors 319 and 321, while the control potentials are represented by oblique vectors 323 and 325 that are also colinear. The latter vectors 323 and 325 lag in phase behind the principal potential vectors 319 and 321 by a large angle.

In Fig. 12 the principal potential which is supplied to the two electric discharge devices 157 and 159 is represented by a full-line sine wave 327. The control potential when the timing circuit 236 is deenergized is represented by a broken-line curve 329 which is a substantial angle out of phase with the principal potential curve. To simplify matters, it may be assumed that the limiting control potential curve of the two main electric discharge devices 157 and 159 is the axis of abscissæ 331.

It will be noted that, in the case represented by the curves 327 and 329, when the timing circuit 236 is deenergized, the electric discharge devices 157 and 159 become energized near the ends of the positive half-cycles of principal potential supplied thereto. Moreover, in the system shown in Fig. 10, the control electrodes 169 and 171 of the electric discharge devices 157 and 159 are connected to opposite terminals 239 and 241 of the phase-shift circuit 237. Consequently, the two electrodes are always in opposite phase to each other, and the control potentials 323 and 325 applied to the respective electric discharge devices 157 and 159 are related to the respective principal potentials 319 and 321 as shown in Fig. 11. When the timing circuit is deenergized, therefore, the electric discharge devices 157 and 159 are energized substantially at the ends of each of a series of successive half-cycles.

When the electric discharge devices 249 and 251 of the timing circuit are energized, half-wave pulses of current are transmitted through the potentiometer 275 and the corresponding potentials are impressed between the intermediate tap 247 of the resistor 243 connected to the control electrodes 169 and 171 of the electric discharge devices 157 and 159 and the junction point 29 of their cathodes 165 and 167. These half-waves are substantially in phase with the corresponding half-waves of the principal potential applied to the electric discharge devices 157 and 159 and may be represented by a series of half-wave curves 333, as in Fig. 12. The net control potential impressed on the electric discharge devices 157 and 159 through which the load 31 is energized may be represented by a curve 335 equal to the sum of the control potential 329 supplied by the phase-shift circuit 237 and the potential 333 supplied by the timing circuit 236. It is to be noted that this control-potential curve 335 either intersects the axis 331 of abscissæ very near to the beginnings of the half-waves of principal potential or lies above the axis 331 nearly up to the various points at which the principal potential changes. Accordingly, when the timing circuit 236 is energized, the electric discharge devices 157 and 159 whereby power is supplied to the load 31 are both at first, energized substantially at the beginnings of the positive half-cycles of principal potential supplied to them.

Since the condition of the timing circuit 236 varies intermittently, the electric discharge devices whereby the load 31 is energized will be intermittently energized for a number of positive half cycles at or near the beginning of each of the half cycles and then for a second succession of half cycles at or near the end of each half cycle. The power source will, therefore, supply energy to the load during the first set of intervals when the timing circuit is energized and will draw energy from the load during the second set of intervals when the timing circuit is deenergized.

I have shown and described in the present application a number of different modifications. My invention is, therefore, not to be restricted to any particular modification, nor is it to be restricted to a system in which a particular type of electric discharge device is utilized. It is to be noted first that while independent electric discharge devices have been illustrated herein as supplying half pulses of current to the load and as drawing half wave pulses of current from the load, such independent devices need not necessarily be utilized. Electric discharge devices in which a common cathode and a plurality of anodes are incorporated are well known in the art and such devices may be utilized in lieu of the devices shown herein. The same principal applies to electric discharge devices having a plurality of cathodes and a common anode.

Moreover, it should be noted that the timing circuit of the system shown in Fig. 10 in lieu of being applied with electric discharge devices of the control electrode type may be applied to a system of the type shown in Fig. 3 or Fig. 5, in which make-alive electric discharge devices are incorporated. In this system the timing circuit will, of course, replace the rotary switch system.

Again, it is well to note that the phase shift system of the type shown in Fig. 5 may replace either of the systems shown in the other views. In all cases where the make alive electric discharge devices are utilized instead of the control electrode electric discharge devices, the operation of the system depends on a current supply to the electric discharge devices rather than on potential variations. However, the current in the absence of phase shifting impedances varies in accordance with the potential and no difficulties are involved in replacing one type of electric discharge device by another.

Finally, attention is called to the fact that my invention should not be restricted to apply only in the limited scope of an improvement of the system shown in my earlier application. Essentially, my invention is directed to a system for converting power of one frequency into power of another frequency. If instead of the pulsating current that is obtained in the systems described hereinabove, alternating current of the lower frequency is desired, a simple system for attaining this purpose may be provided in accordance with my invention.

In such apparatus, two similar systems of the type described hereinabove are provided. The loads 31 of the two systems are the primaries of a common transformer having a single secondary and the systems are so connected that the supply of pulses to one load or primary is of opposite polarity to the supply of pulses to the other load or primary. The contactors 33 and 35 or 115 and 117 or the timing circuits 236 of the systems whereby the loads are supplied are of such character that after a pulse is supplied to one primary no further current is supplied to it for the period of time during which the pulse is supplied and during this interval a pulse is supplied to the other primary that is of opposite polarity to the pulse supplied to the first primary. Accordingly, in the secondary of the transformer, a current will be induced by the periodicity of the pulses.

It is to be noted that more than two systems such as are described hereinabove may also be utilized to feed the primaries of a common transformer. In such a case, the currents supplied to the individual primaries bear a predetermined phase relationship to each other and plural phase power is supplied by the secondary of the transformer.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In combination in a power supply system for a load of the type having the property of storing a portion of the energy supplied thereto, an alternating power supply source, a set of electrodes between which an electric discharge is to be transmitted, another set of electrodes between which an electric discharge is to pass, each of said sets of electrodes being of such character that the discharge of only one polarity can be transmitted therebetween, means for so coupling said sets of electrodes to said power source and to said load that when the potential impressed across one of said sets of electrodes is of such polarity that said set is conductive to the discharge current transmitted under the electromotive force of said potential the other set of electrodes is non-conductive to the discharge current that would be transmitted under the electromotive force thereof and when the potential is of such polarity that said last-named set is conductive to the discharge current transmitted under the electromotive force thereof said first-named set is non-conductive, means, associated with each of said sets of electrodes, for initiating a discharge therebetween when the potential impressed between said electrodes is of proper polarity for the transmission of a discharge, means for actuating said discharge initiating means to initiate a discharge between each of the electrodes of said sets substantially at the beginnings of a group of successive intervals during which the potentials impressed between the electrodes of said sets by said power source is of proper polarity for the transmission of a discharge between said sets, whereby current is transmitted from said source to said load through said sets of electrodes, and means for activating said discharge initiating means to initiate a discharge between each of the electrodes of said sets substantially at the ends of a group of successive intervals during which the potentials impressed between the electrodes of said sets is of proper polarity for the transmission of a discharge therebetween, whereby energy stored in said load is fed back into said power source through said sets of electrodes.

2. In combination in a power supply system for a load of the type having the property of storing a portion of the energy supplied thereto, an alternating power supply source, a set of electrodes between which an electric discharge is to be transmitted, another set of electrodes between which an electric discharge is to be transmitted, each of said sets of electrodes being of such character that the discharge of only one polarity can be transmitted therebetween, means for so coupling said sets of electrodes to said power source and to said load that when the potential impressed across one of said sets of electrodes by said power source is of such polarity that said set is conductive to the discharge current transmitted under the electromotive force of said potential the other set of electrodes is non-conductive to the discharge current that would be transmitted under the electromotive force thereof and when the potential is of such polarity that said last-named set is conductive to the discharge current transmitted under the electromotive force thereof, said first-named set is non-conductive, means, associated with each of said sets of electrodes, for initiating a discharge therebetween, each of said sets of electrodes remaining nonconducting, even when the potential impressed between said electrodes is of proper polarity for the transmission of a discharge, when its associated initiating means is in a non-activated condition, and means for activating said initiating means associated with each of said sets substantially at the beginnings of each of a group of successive half cycles during which the potential of said source is such that each set is in its turn conductive to discharge current transmitted under the electromotive force of said potential whereby current is transmitted from said source to said load through said sets of electrodes and for activating said initiating means near the ends of each of another group of half-cycles during which the potential impressed between the electrodes of each set in its turn is such that said sets are conductive to the discharge current therebetween, said first-named group of half-cycles being separated from said last-named group of half-cycles by nearly a half-cycle during which said initiating means is unactivated, whereby the energy stored in said load is fed through said sets of electrodes into said source.

3. Apparatus for supplying power to a load of the type that has the property of storing a portion of the energy supplied thereto, comprising means, including a transformer winding having a plurality of terminal taps and an intermediate tap, for supplying alternating power, a plurality of pairs of electrodes between which an electric discharge current is to be transmitted, means for coupling an electrode of one of said pairs to one terminal tap of said winding, means for coupling the corresponding electrode of another of said pairs to another terminal tap of said winding, means for coupling the other electrodes of said pairs to each other, means for coupling said load between the electrical junction point of said last-named electrodes and the intermediate tap of said winding, means, associated with each of said pairs of electrodes, for initiating a discharge between said electrodes when the principal potential impressed therebetween from said power source is positive, and means for activating said initiating means to respectively initiate the discharge between said pairs of electrodes substantially at the beginnings of each half cycle of a group of successive positive half cycles of principal potential, whereby said load is supplied with energy from said source through said pairs of electrodes, and for activating said initiating means to initiate the discharge between said pairs of electrodes near the ends of each half-cycle of a group of successive positive half cycles of principal potential, separated from said first named group of half-cycles by nearly a complete half-cycle of principal potential, whereby the energy stored in said load is fed back into said source through said sets of electrodes.

4. Apparatus for supplying power to a load of the type having the property of storing a portion of the energy supplied thereto, comprising a plurality of sets of electrodes between which an electric discharge current is to pass, the electrodes of each of said sets being of such character that each set passes discharge current of one polarity and prevents the passage of discharge current of the opposite polarity, power supply means cooperating with said sets of electrodes to impress potentials between the electrodes of each of said sets, the cooperative relationship of said power supply means and said sets of electrodes being such that the potential impressed across the electrodes of one set is in opposite phase to the potential impressed across the electrodes of another set, means, associated with each of said sets of electrodes to be activated, for initiating an electric discharge between the electrodes of its associated set, and means for activating said initiating means, to initiate the discharge alternately between the electrodes of each of said sets substantially at the beginnings of each half cycle of a plurality of successive half cycles of potential impressed between the electrodes of each set in its turn, that is of such polarity that the particular set of electrodes is conductive to the discharge current transmitted under the electromotive force of said potential, whereby said load is energized from said power supply through said sets of electrodes, and for subsequently activating said initiating means near the ends of each half cycle of a plurality of successive half cycles of potential, impressed between the electrodes of each of said sets in its turn, that is of such polarity that the particular set is conductive to discharge current transmitted under the electromotive force thereof, whereby the energy stored in said load is fed back into said power source through said sets of electrodes.

5. Apparatus for supplying power to a load of the type having the property of storing a portion of the energy supplied thereto, comprising a plurality of sets of electrodes between which an electric discharge current is to pass, the electrodes of each of said sets being of such character that each set passes discharge current of one polarity and prevents the passage of discharge current of the opposite polarity, power supply means cooperating with said sets of electrodes to impress potentials between the electrodes of each of said sets, the cooperative relationship of said power supply means and said sets of electrodes being such that the potential impressed across the electrodes of one set is in opposite phase to the potential impressed across the electrodes of another set, means, associated with each of said sets of electrodes for initiating an electric discharge therebetween, said initiating means being adapted to be activated by means of a potential of a predetermined magnitude and polarity relative to the magnitude and polarity of the potential impressed between the electrodes of its associated set, and means for impressing activating potentials of proper magnitude and polarity to said initiating means of each of said sets to activate said initiating means, and to initiate the discharge alternately between the electrodes of each of said sets substantially at the beginnings of each half cycle of a plurality of successive half-cycles of potential, impressed between the electrodes of each set in its turn, that is of such polarity that the particular set of electrodes is conductive to the discharge current transmitted under the electromotive force of said potential, whereby said load is energized from said power supply through said sets of electrodes; and for subsequently impressing activating potentials of proper magnitude and polarity to said initiating means of each of said sets to activate said initiating means near the ends of each half cycle of a plurality of successive half cycles of potential, impressed between the electrodes of each of of said sets in its turn, that is of such polarity that the particular set is conductive to discharge current transmitted under the electromotive force thereof, whereby the energy stored in said load is fed back into said power source through said sets of electrodes.

6. Apparatus for supplying power to a load of the type having the property of storing a portion of the energy supplied thereto, comprising a plurality of sets of electrodes between which an electric discharge current is to pass, the electrodes of each of said sets being of such character that each set passes discharge current of one polarity and prevents the passage of discharge current of the opposite polarity, power supply means cooperating with said sets of electrodes to impress potentials between the electrodes of each of said sets, the cooperative relationship of said power supply means and said sets of electrodes being such that the potential impressed across the electrodes of one set is in opposite phase to the potential impressed across the electrodes of another set, means associated with each of said sets of electrodes for intiating an electric discharge therebetween, said initiating means being adapted to be activated by means of a potential of a predetermined magnitude and polarity relative to the magnitude and polarity of the potentials impressed between the electrodes of its associated set, means for impressing, on the initiating means associated with each of said sets of electrodes, alternating potentials that are of such magnitudes, phases and polarities relative to the potentials impressed between the corresponding electrodes of the sets that said initiating means is activated to initiate a discharge between the electrodes of said sets in their turn substantially at the beginnings of a plurality of half cycles of potential, impressed between the electrodes of said sets, that are of such polarity that said sets are conductive to the discharge current transmitted under the electromotive forces thereof, whereby said load is energized from said source through said sets of electrodes; and means for subsequently shifting the phase of said alternating potential impressed on each of said initiating means to such a point that said initiating means are activated to initiate the discharge near the ends of a plurality of successive half cycles of potential, impressed on the electrodes of each of said sets in its turn, that are of such polarity that the sets of electrodes are conductive to a discharge current transmitted under the electromotive force thereof, whereby the energy stored in said load is fed back into said source thorugh said sets of electrodes.

7. Apparatus for supplying power to a load of the type having the property of storing a portion of the energy supplied thereto, comprising a plurality of sets of electrodes between which an electric discharge current is to pass, the electrodes of each of said sets being of such character that each set passes discharge current of one polarity and prevents the passage of discharge current of the opposite polarity, power supply means cooperating with said sets of electrodes to impress potentials between the electrodes of each of said sets, the cooperative relationship of said power supply means and said sets of electrodes being such that the potential impressed across the electrodes of one set is in opposite phase to the potential impressed across the electrodes of another set, means associated with each of said sets of electrodes for initiating an electric discharge therebetween, said initiating means being adapted to be activated by the passage of a current of a predetermined magnitude and polarity, relative to the magnitude and polarity of the potential impressed between the electrodes of its associated set, transmitted through it and through an electrode of the corresponding set, and means for transmitting current of proper polarity and magnitude through each of said initiating means and the cooperating electrode of its associated set, to initiate the discharge alternately between the electrodes of each of said sets substantially at the beginnings of each half cycle of a plurality of successive half cycles of potential, impressed between the electrodes of each set in its turn, that is of such polarity that the particular set of electrodes is conductive to the discharge current transmitted under the electromotive force of said potential, whereby said load is energized from said power supply through said sets of electrodes, and for transmitting currents of proper polarity and magnitude between each of said initiating means and the cooperating electrode of its associated set near the ends of each half cycle of a plurality of successive half cycles of potential impressed between the electrodes of each of said sets in its turn, that is of such polarity that the particular set is conductive to discharge current transmitted under the electromotive force thereof, whereby the energy stored in said load is fed back into said power source through said sets of electrodes.

8. Apparatus for supplying power to a load of the type having the property of storing a portion of the energy supplied thereto, comprising a plurality of sets of electrodes between which an electric discharge current is to pass, the electrodes of each of said sets being of such character that each set passes discharge current of one polarity and prevents the passage of discharge current of the opposite polarity, power supply means cooperating with said sets of electrodes to impress potentials between the electrodes of each of said sets, the cooperative relationship of said power supply means and said sets of electrodes being such that the potential impressed across the electrodes of one set is in opposite phase to the potential impressed across the electrodes of another set, means associated with each of said sets of electrodes for initiating an electric discharge therebetween, said initiating means being adapted to be activated by the passage of a current of a predetermined magnitude and polarity, relative to the magnitude and polarity of the potential impressed between the electrodes of its associated set, transmitted through it and through an electrode of the corresponding set, means for transmitting through each of the initiating means and the cooperating electrodes of its associate set, alternating currents that are of such magnitude, phases and polarities relative to the potentials impressed between the electrodes of each of said sets that said initiating means is activated to initiate a discharge between the electrodes of said sets in their turn substantially at the beginnings of a plurality of half cycles of potential, impressed between the electrodes of said sets, that are of such polarity that said sets are conductive to the discharge current transmitted under the electromotive force thereof, whereby said load is energized from said source through said sets of electrodes, and means for subsequently shifting the phase of said alternating current transmitted through said initiating means to such a point that said initiating means is activated to initiate the discharge near the ends of a plurality of successive half cycles of potential, impressed by said power source on the electrodes of each of said sets in its turn, that are of such polarity that the sets of electrodes are conductive to a discharge current transmitted under the electro-motive force thereof, whereby the energy stored in said load is fed back into said source through said sets of electrodes.

9. Apparatus for supplying power to a load of the type having the property of storing a portion of the energy supplied thereto, comprising a plurality of sets of electrodes between which an electric discharge current is to pass, the electrodes of each of said sets being of such character that each set passes discharge current of one polarity and prevents the passage of discharge current of the opposite polarity, power supply means cooperating with said sets of electrodes to impress potentials between the electrodes of each of said sets, the cooperative relationship of said power supply means and said sets of electrodes being such that the potential impressed across the electrodes of one set is in opposite phase to the potential impressed across the electrodes of another set, means associated with each of said sets of electrodes for initiating an electric discharge therebetween, said initiating means being adapted to be activated by the passage of a current of a predetermined magnitude and polarity, relative to the magnitude and polarity of the potential impressed between the electrodes of its associated set, transmitted through it and through an electrode of the corresponding set, and means including a plurality of electric discharge devices associated with said initiating means, a separate one of said electric discharge devices being associated with the initiating means that cooperates with each set of electrodes, for transmitting currents of proper polarity and magnitude through each of said initiating means and the cooperating electrode of its associated set to initiate the discharge alternately between the electrodes of each of said sets substantially at the beginnings of each half cycle of a plurality of successive half cycles of potential impressed between the electrodes of each set in its turn, that is of such polarity that the particular set of electrodes is conductive to the discharge current transmitted under the electromotive force of said potential, whereby said load is energized from said power supply through said sets of electrodes, and for transmitting currents of proper polarity and magnitude through each of said initiating means and the cooperating electrode of its associated set near the ends of each half cycle of a plurality of successive half cycles of potential, impressed between the electrodes of each of said sets in its turn, that is of such polarity that the particular set is conductive to discharge current transmitted under the electromotive force thereof, whereby the energy stored in said load is fed back into said power source through said sets of electrodes.

10. Apparatus for supplying power to a load of the type having the property of storing a portion of the energy supplied thereto, comprising a plurality of sets of electrodes between which an electric discharge current is to pass, the electrodes of each of said sets being of such character that each set passes discharge current of one polarity and prevents the passage of discharge current of the opposite polarity, power supply means cooperating with said sets of electrodes to impress potentials between the electrodes of each of said sets, the cooperative relationship of said power supply means and said sets of electrodes being such that the potential impressed between the electrodes of one set is in opposite phase to the potential impressed between the electrodes of another set, means, associated with each of said sets of electrodes to be activated, for initiating an electric discharge between the electrodes of its associated set, means for activating said initiating means, to initiate the discharge alternately between the electrodes of each of said sets substantially at the beginnings of each half cycle of a plurality of successive half cycles of potential impressed between the electrodes of each set in its turn, that is of such polarity that the particular set of electrodes is conductive to the discharge current transmitted under the electromotive force of said potential, whereby said load is energized from said power supply through said sets of electrodes, and means for subsequently varying the activation of said initiating means in such manner that the discharge is initiated near the ends of each half cycle of a plurality of successive half cycles of potential impressed between the electrodes of each of said sets in its turn, that is of such polarity that the particular set is conductive to discharge current transmitted under the electromotive force thereof, whereby the energy stored in said load is fed back into said power source through said sets of electrodes.

11. Apparatus for supplying power to a load of the type having the property of storing a portion of the energy supplied thereto, comprising a plurality of sets of electrodes between which an electric discharge current is to pass, the electrodes of each of said sets being of such character that each set passes discharge current of one polarity and prevents the passage of discharge current of the opposite polarity, power supply means cooperating with said sets of electrodes to impress potentials between the electrodes of each of said sets, the cooperative relationship of said power supply means and said sets of electrodes being such that the potential impressed between the electrodes of one set is in opposite phase to the potential impressed between the electrodes of another set, means, associated with each of said sets of electrodes to be activated, for initiating an electric discharge between the electrodes of its associated set, means for activating said initiating means, to initiate the discharge alternately between the electrodes of each of said sets substantially at the beginnings of each half cycle of a plurality of successive half cycles of potential impressed between the electrodes of each set in its turn, that is of such polarity that the particular set of electrodes is conductive to the discharge current transmitted under the electromotive force of said potential, whereby said load is energized from said power supply through said sets of electrodes; and means, including an electrical timing circuit, for subsequently varying the activation of said initiating means in such manner that the discharge is nitiated near the ends of each half cycle of a plurality of successive half cycles of potential impressed between the electrodes of each of said sets in its turn, that is of such polarity that the particular set is conductive to discharge current transmitted under the electromotive force thereof, whereby the energy stored in said load is fed back into said power source through said sets of electrodes.

12. Apparatus for supplying power to a load of the type having the property of storing a portion of the energy supplied thereto, comprising a plurality of sets of electrodes between which an electric discharge current is to pass, the electrodes of each of said sets being of such character that each set passes discharge current of one polarity and prevents the passage of discharge current of the opposite polarity, power supply means cooperating with said sets of electrodes to impress potentials between the electrodes of each of said sets, the cooperative relationship of said power supply means and said sets of electrodes being such that the potential impressed across the electrodes of one set is in opposite phase to the potential impressed across the electrodes of another set, means, associated with each of said sets of electrodes to be activated, for initiating an electric discharge between the electrodes of its associated set, means for activating said initiating means to initiate the discharge alternately between the electrodes of each of said sets substantially at the beginnings of each half cycle of a plurality of successive half cycles of potential impressed between the electrodes of each set in its turn, that is of such polarity that the particular set of electrodes is conductive to the discharge current transmitted under the electromotive force of said potential, whereby said load is energized from said power through said sets of electrodes, and means, including an electrical timing circuit of the type incorporating an electric discharge device, for subsequently varying the activation of said initiating means in such manner that the discharge is initiated near the ends of each half cycle of a plurality of successive half cycles of potential impressed between the electrodes of each of said sets in its turn, that is of such polarity that the particular set is conductive to discharge current transmitted under the electromotive force thereof, whereby the energy stored in said load is fed back into said power source through said sets of electrodes.

13. The method of utilizing an asymmetrically conducting device to supply power intermittently from an alternating power supply source to a load of the type having the property of storing a portion of the energy supplied thereto; which comprises intermittently supplying energy to said load through said device during a plurality of intervals during which the polarity of the potential of said power source is such that said device is conductive thereto, for a predetermined period of time, and subsequently, for a second predetermined period of time, intermittently feeding the resultant energy stored in said load back into said power source through said device during a plurality of intervals during which the polarity of the potential of said power source is such that said device is non-conductive thereto, and simultaneously, during the second-mentioned period of time, intermittently providing an alternative electrical path interconnecting said source and said load, in such manner as to exclude said device during substantially all of the intervals during which the principal potential supplied thereto from said source is of such polarity that said device is conductive thereto, thereby preventing any considerable amount of energy from being supplied to said load while the load is feeding energy back to said source.

14. Power-supply apparatus for a load of the type having the property of storing a portion of the energy supplied thereto, comprising a power-supply source, an electric discharge device incorporating means to be energized for initiating a discharge therein, means for coupling said electric discharge device between said load and said source, means for energizing said initiating means in such manner as to cause said discharge device to transmit power from said source to said load for a predetermined period of time, means for thereafter changing the condition of said discharge-initiating means in such manner as to cause said discharge device to transmit power from said load to said source for a second period of time, whereby, during the latter period of time, the energy stored in said load is fed back to said source through said discharge device, and means for preventing the supply of any considerable amount of power from said source to said load during said second period of time.

15. The method of utilizing a plurality of asymmetrically conducting electric discharge devices to supply power from an alternating power-supply source to a load of a type having the property of storing a portion of the energy supplied thereto; which comprises so energizing said electric discharge devices that when the polarity of the potential of said source as applied to one of said devices is such that said device is conductive to current transmitted under the electromotive force thereof, the polarity of said source as applied to another of said devices is such that the latter device is non-conductive to current transmitted under the electromotive force thereof, and vice versa, alternately energizing said first-named electric discharge device and said last-named electric discharge device for a predetermined period of time in successive intervals during which the polarity of the potential of said power source is such that each of said devices is respectively conductive to the current transmitted under the electromotive force thereof, to supply current to said load, and, for another period of time, immediately succeeding the first-mentioned period, causing said discharge devices to be respectively deenergized substantially during the intervals during which the potentials impressed thereon from said source are of such polarity that said discharge devices would be conductive to the current transmitted under the electromotive force thereof, while causing said discharge devices to be energized substantially during the intervals during which the potentials supplied by said source are of the opposite polarities, whereby the energy stored in said load is fed back to said source.

16. The method of utilizing a plurality of asymmetrically conducting electric discharge devices to supply power from an alternating power-supply source to a load of the type having the property of storing a portion of the energy supplied thereto, each of said devices having a control electrode and a plurality of principal electrodes, and being of a type having an energized condition and a deenergized condition, and being capable of only abrupt transition from said deenergized condition to said energized condition when the potentials impressed between said principal electrodes and between said control electrode and one of its principal electrodes attain values related to each other in a predetermined manner in magnitude and in polarity, and being capable of transition from said energized condition to said deenergized condition only when the potential impressed between said principal electrodes attains a predetermined lower limit; said method comprising the steps of so coupling said electric discharge devices between said load and said power source that when the polarity of the potential of said power source is such that one of said discharge devices is conductive to current transmitted under the electromotive force of said power source, another of said discharge devices is non-conductive thereto, and when the polarity of said source is such that said last-named device is conductive to said current said first-named device is non-conductive; impressing such potentials between said principal electrodes and between the control electrode of each device and its associated principal electrode that said devices are alternately in energized condition under the influence of the potential of the power source, for a predetermined period of time, while the potential of said source is such that each of said devices is respectively conductive to the current transmitted under the electromotive force thereof, thereby to transmit current to said load from said power source; and subsequently, for a second period of time, impressing such potentials between said principal electrodes and between the control electrode of each device and its associated principal electrode that said devices are in deenergized condition, while the potentials of said source are such that current can be transmitted through said discharge device under the electromotive force thereof, but in energized condition under the influence of the potential arising by reason of the stored energy in said load, while the potentials of said source are such that said discharge devices are non-conductive to current transmitted under the electromotive force thereof, whereby the energy stored in said load is fed back into said power source.

17. Apparatus for supplying power intermittently from an alternating power supply source to a load of the type having the property of storing a portion of the energy supplied thereto, comprising, in combination, an asymmetrically conducting device, means for intermittently supplying energy to said load through said device during a plurality of intervals during which the polarity of the potential of said power source is such that said device is conductive thereto, for a predetermined period of time, and means for subsequently, for a second predetermined period of time, intermittently feeding the resultant energy stored in said load back into said power source through said device during a plurality of intervals during which the polarity of the potential of said power source is such that said device is non-conductive thereto, said last-mentioned means including means for simultaneously, during the second-mentioned period of time, intermittently providing an alternative electrical path interconnecting said source and said load, in such manner as to exclude said device during substantially all of the intervals during which the principal potential supplied thereto from said source is of such polarity that said device is conductive thereto, thereby preventing any considerable amount of energy from being supplied to said load while the load is feeding energy back to said source.

18. Apparatus for supplying power from an alternating power-supply source to a load of a type having the property of storing a portion of the energy supplied thereto, comprising, in combination, a plurality of asymmetrically conducting electric discharge devices, means for so energizing said electric discharge devices that when the polarity of the potential of said source as applied to one of said devices is such that said device is conductive to current transmitted under the electromotive force thereof, the polarity of said source as applied to another of said devices is such that the latter device is non-conductive to current transmitted under the electromotive force thereof, and vice versa, means for alternately energizing said first-named electric discharge device and said last-named electric discharge device for a predetermined period of time in successive intervals during which the polarity of the potential of said power source is such that each of said devices is respectively conductive to the current transmitted under the electromotive force thereof, to supply current to said load, and, means operative for another period of time, immediately succeeding the first-mentioned period, for causing said discharge devices to be respectively deenergized substantially during the intervals during which the potentials impressed thereon from said source are of such polarity that said discharge devices would be conductive to the current transmitted under the electromotive force thereof, while causing said discharge devices to be energized substantially during the intervals during which the potentials supplied by said source are of the opposite polarities, whereby the energy stored in said load is fed back to said source.

19. Apparatus for supplying power from an alternating power-supply source to a load of the type having the property of storing a portion of the energy supplied thereto, comprising, in combination, a plurality of asymmetrically conducting electric discharge devices, each of said devices having a control electrode and a plurality of principal electrodes, and being of a type having an energized condition and a deenergized condition, and being capable of only abrupt transition from said deenergized condition to said energized condition when the potentials impressed between said principal electrodes and between said control electrode and one of its principal electrodes attain values related to each other in a predetermined manner in magnitude and in polarity, and being capable of transition from said energized condition to said deenergized condition only when the potential impressed between said principal electrodes attains a predetermined lower limit, means for so coupling said electric discharge devices between said load and said power source that when the polarity of the potential of said power source is such that one of said discharge devices is conductive to current transmitted under the electromotive force of said power source, another of said discharge devices is non-conductive thereto, and when the polarity of said source is such that said last-named device is conductive to said current said first-named device is non-conductive, means for impressing such potentials between said principal electrodes and between the control electrode of each device and its associated principal electrode that said devices are alternately in energized condition under the influence of the potential of the power source, for a predetermined period of time, while the potential of said source is such that each of said devices is respectively conductive to the current transmitted under the electromotive force thereof, thereby to transmit current to said load from said power source, and means for subsequently, for a second period of time, impressing such potentials between said principal electrodes and between the control electrode of each device and its associated principal electrode that said devices are in deenergized condition, while the potentials of said source are such that current can be transmitted through said discharge device under the electromotive force thereof, but in energized condition under the influence of the potential arising by reason of the stored energy in said load, while the potentials of said source are such that said discharge devices are non-conductive to current transmitted under the electromotive force thereof, whereby the energy stored in said load is fed back into said power source.

20. The method of utilizing a plurality of controllable asymmetrically conducting electric discharge devices to transfer power between an alternating-current device and an inductive unidirectional-current device, said alternating-current device and said unidirectional-current device each having, at times, electromotive forces capable of supplying power to the other; said method comprising the steps of, at times, so controlling said electric discharge devices that they become conducting sufficiently soon in their respective conducting periods to transfer a predominant amount of power from said alternating-current device to said unidirectional-current device, each electric discharge device remaining conducting substantially until the resultant electromotive force thereacross becomes smaller than a critical minimum value, and, at other times, so controlling said electric discharge devices that they become conducting sufficiently late in their respective conducting periods to transfer only a small amount of power from said alternating-current device to said unidirectional-current device, each electric discharge device remaining conducting substantially until the resultant electromotive force thereacross becomes smaller than a critical minimum value, whereby a predominant amount of power is transferred from said unidirectional-current device to said alternating-current device.

21. A power-translating system comprising, in combination, an alternating-current device and an inductive unidirectional-current device each having, at times, electromotive forces capable of supplying power to the other, a plurality of controllable asymmetrically conducting electric discharge devices for transferring power between said alternating-current device and said unidirectional-current device, means for, at times, so controlling said electric discharge devices that they become conducting sufficiently soon in their respective conducting periods to transfer a predominant amount of power from said alternating-current device to said unidirectional-current device, each electric discharge device remaining conducting substantially until the resultant electromotive force thereacross becomes smaller than a critical minimum value, and means for, at other times, so controlling said electric discharge devices that they become conducting sufficiently late in their respective conducting periods to transfer only a small amount of power from said alternating-current device to said unidirectional-current device, each electric discharge device remaining conducting substantially until the resultant electromotive force thereacross becomes smaller than a critical minimum value, whereby a predominant amount of power is transferred from said unidirectional-current device to said alternating-current device.

22. The method of utilizing a plurality of controllable asymmetrically conducting electric discharge devices to transfer power between an alternating-current device and a unidirectional-current device, said alternating-current device and said unidirectional-current device each having, at times, electromotive forces capable of supplying power to the other; said method comprising the steps of, at times, so controlling said electric discharge device that they become conducting sufficiently soon in their respective conducting half-cycles when the potential of the alternating-current device is higher than the potential of the unidirectional-current device so as to transfer a predominant amount of power from said alternating-current device to said unidirectional-current device, each electric discharge device remaining conducting substantially until the resultant electromotive force thereacross becomes smaller than a critical minimum value, and, at other times, so controlling said electric discharge devices that they become conducting sufficiently late in said half-cycles so that a predominant amount of power is transferred from said unidirectional-current device to said alternating-current device.

23. A power-translating system comprising, in combination, an alternating-current device and a unidirectional-current device each having, at times, electromotive forces capable of supplying power to the other, a plurality of controllable asymmetrically conducting electric discharge devices for transferring power between said alternating-current device and said unidirectional-current device, means for, at times, so controlling said electric discharge devices that they become conducting sufficiently soon in their respective conducting half-cycles when the potential of the alternating-current device is higher than the potential of the unidirectional-current device so as to transfer a predominant amount of power from said alternating-current device to said unidirectional-current device, each electric discharge device remaining conducting substantially until the resultant electromotive force thereacross becomes smaller than a critical minimum value, and means for, at other times, so controlling said electric discharge devices that they become conducting sufficiently late in said half-cycles so that a predominant amount of power is transferred from said unidirectional-current device to said alternating-current device.

JOHN W. DAWSON.